United States Patent [19]

Tanaka et al.

[11] Patent Number: 4,992,640
[45] Date of Patent: Feb. 12, 1991

[54] WIRE ELECTRIC DISCHARGE MACHINING APPARATUS

[75] Inventors: Makoto Tanaka; Jun Aramaki; Shiro Imai, all of Nagoya, Japan

[73] Assignee: Mitsubishi Denki Kabushiki Kaisha, Tokyo, Japan

[21] Appl. No.: 470,001

[22] Filed: Jan. 25, 1990

[30] Foreign Application Priority Data

Jan. 27, 1989 [JP] Japan .................................. 1-8661[U]

[51] Int. Cl.$^5$ .............................................. B23H 7/02
[52] U.S. Cl. ................................. 219/69.12; 219/69.14
[58] Field of Search ............................ 219/69.12, 69.14

[56] References Cited

U.S. PATENT DOCUMENTS

| | | | |
|---|---|---|---|
| 4,565,915 | 1/1986 | Girardin | 219/69.12 |
| 4,647,747 | 3/1987 | Goto | 219/69.12 |
| 4,663,509 | 5/1987 | Kawashima | 219/69.12 |
| 4,918,279 | 4/1990 | Babel et al. | 219/69.12 |

FOREIGN PATENT DOCUMENTS 133160 10/1987 European Pat. Off. .
60-52223 3/1985 Japan .
654777 9/1986 Switzerland .

*Primary Examiner*—Geoffrey S. Evans
*Attorney, Agent, or Firm*—Sughrue, Mion, Zinn, Macpeak & Seas

[57] ABSTRACT

A wire electric discharge machining apparatus comprises a tank having an opening at its one side surface, which is movable in a two-dimensional plane, a shielding body having a through hole, which is in slide-contact with the side surface having the opening of the tank so as to close the opening, an arm which has first and second ends, at least one of which is fixed to a machine body and the other is extended into the tank through the through hole and the opening, and which supports in the tank a wire guide for guiding a wire electrode to a workpiece placed in the tank, an enclosure member capable of expansion and contraction in response to a relative movement of the tank to the arm, the enclosure member having both ends sealingly connected to the circumferential portion of the through hole of the shielding body and the machine body respectively, and a working liquid supplying device for supplying a working liquid to the tank through a space formed between the arm and the enclosure member.

5 Claims, 7 Drawing Sheets

WIRE ELECTRIC DISCHARGE MACHINING APPARATUS

BACKGROUND OF THE INVENTION

FIELD OF THE INVENTION

The present invention relates to a wire discharge machining apparatus capable of supplying a working liquid without applying a mechanical load to a tank in which a workpiece is placed.

DISCUSSION OF BACKGROUND

FIG. 3 is a side view showing a conventional wire electric discharge machining apparatus wherein a reference numeral 1 designates a bed, a numeral 2 designates a Y slider capable of reciprocating in the direction of Y axis, a numeral 3 designates an X slider capable of reciprocating in the direction of X axis, a numeral 10 designates a tank containing therein a working liquid in which a workpiece is immersed and which is capable of moving in the directions of X and Y axis on an X Y cross table which is constituted by the X, Y sliders 2, 3, a numeral 14 designates an arm which has an end fixed to a column 26 of a machine body and the other end extending in the tank 10 to support a wire guide for guiding a wire electrode (not shown) for processing the workpiece in the tank, and which is capable of moving relative moving to the tank 10, and a numeral 30 designates a hose for supplying the working liquid to the tank 10. As described above, the conventional wire electric discharge machining apparatus for processing a workpiece in the working liquid in the tank 10 has the wire electrode capable of relative movement in the directions of X and Y in the tank, and the arm 14 for supporting the wire e.lectrode, which extends in the tank 10 through an opening formed in a side surface of the tank 10. FIG. 4 is a cross-sectional plan view of the tank 10. In FIG. 4, a numeral 12 designates the above-mentioned working liquid. The workpiece is fixed to a base (not shown) moved along with the tank 10 so that the wire electrode can be moved relative to the base. A numeral 16 designates an elongated hole which corresponds to an opening formed in a side surface of the tank 10, by which the tank 10 can be relatively moved in a direction, for instance in the direction of Y axis to the arm 14. A numeral 18 designates a shielding plate arranged at the outside of the side surface of the tank 10 in which the elongated hole is formed. Numerals 20 designate bearings which maintain a small gap between the shielding plate 18 and the tank 10. A numeral 22 designates a packing fitted to the inner edge of the elongated hole 16 so that it is in contact with both the tank 10 and the shielding plate 18 so as to seal therebetween. A numeral 24 designates a sealing member which is fitted to the inner edge of a through hole formed in the shielding plate 18 and which is in contact with the outer circumference of the arm 14 in a slidable manner. A numeral 26 designates a column which secures an end of the arm 14 so that the other end of the arm is extended in the tank 10. A numeral 28 designates an ejection port which may be formed more than one in number in the wall of the tank 10. A hose 30 is connected to the ejecting port 28. A numeral 32 designates a working liquid supplying means which comprises a feeding pump 34 for supplying the working liquid to the tank 10 via the hose 30 and the ejecting port 28 and a filtering pump 38 for supplying the working liquid containing working sludge to a filter 36 for filtering. A numeral 40 designates a discharge liquid recovering container for collecting a discharge liquid from the tank 10 and feeding it to the working liquid supplying means 32 through a hose 42.

FIG. 5 is a diagram showing the arm 14 and the tank 10 when they are relatively moved. In FIG. 5, the same reference numerals designate the same parts as in FIG. 3 and description of these parts is omitted.

The function of the conventional wire electric discharge machining apparatus will be described. Description as to how wire electric discharge machining is carried out is omitted, and only the function of the working liquid 12 in the tank 10 will be described. Due to the packing 22 provided between the shielding plate 18 and the tank 10, and the sealing member 24 provided between the outer circumference of the arm 14 and the shielding plate 18, there is no leakage of the working liquid 12 stored in the tank 10 through the elongated hole 16, which allows the movement of the arm 14 to the shielding plate 18.

On the other hand, a working liquid 12 without including sludge is supplied to the tank 10 through the ejecting port 28 by means of the feeding pump 34. During wire electric discharge machining, sludge is produced and the working liquid 12 including the sludge is discharged in the discharge liquid recovering container 40, whereby the working liquid in the tank 10 is kept clean. When the arm 14 is moved relative to the tank 10, the hose 30 accompanies the operation of the tank as shown in FIG. 5.

In the conventional wire electric discharge machining apparatus having the construction as described above, the hose 30 connected to the tank 10 constitutes a load when the tank 10 is moved relative to the arm 14. As a result, an error is produced in the movement of the tank 10, whereby there takes place an error in the relative position between the wire electrode and the workpiece, which reduces an accuracy of machining. Further, it is necessary to use the sealing member 24 in order to prevent the working liquid from leaking out of the tank 10.

SUMMARY OF THE INVENTION

It is an object of the present invention to eliminate the above-mentioned disadvantage and to provide a wire electric discharge machining apparatus which does not reduce accuracy of machining and does not require a sealing member. In accordance with the present invention, there is provided a wire electric discharge machining apparatus which comprises a tank having an opening at its one side surface, which is movable in a two-dimensional plane, a shielding body having a through hole, which is in slidecontact with the side surface having the opening of the tank so as to close the opening, an arm which has ends, at least one of which is fixed to a machine body and the other is extended into the tank through the through hole and the opening, and which supports in the tank a wire guide for guiding a wire electrode to a workpiece placed in the tank, an enclosure member capable of expansion and contraction in response to a relative movement of the tank to the arm, the enclosure member having both ends sealingly connected to the circumferential portion of the through hole of the shielding body and the machine body respectively, and a working liquid supplying means for supplying a working liquid to the tank through a space formed between the arm and the enclosure member.

BRIEF DESCRIPTION OF DRAWINGS

A more complete appreciation of the invention and many of the attendant advanta9es thereof will be readily obtained as the same becomes better understood by reference to the following detailed description when considered in connection with the accompanying drawings, wherein.

DETAILED DESCRIPTION OF PREFERRED EMBODIMENTS

Preferred embodiments of the wire electric discharge machining apparatus of the present invention will be described with reference to the drawings.

Figure 1:
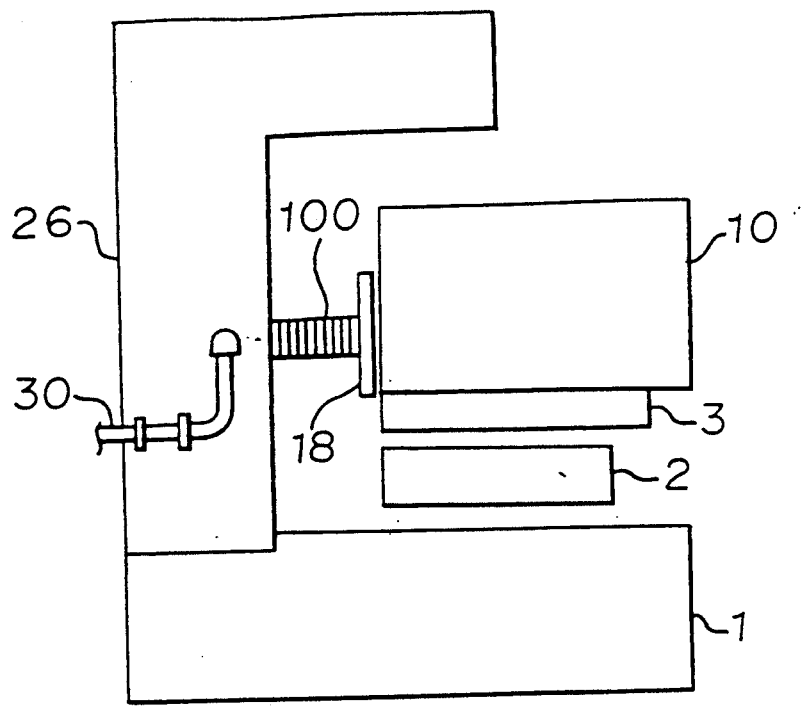
FIG. 1 is a side view of an embodiment of the wire electric discharge machining apparatus according to the present invention.
Figure 3:
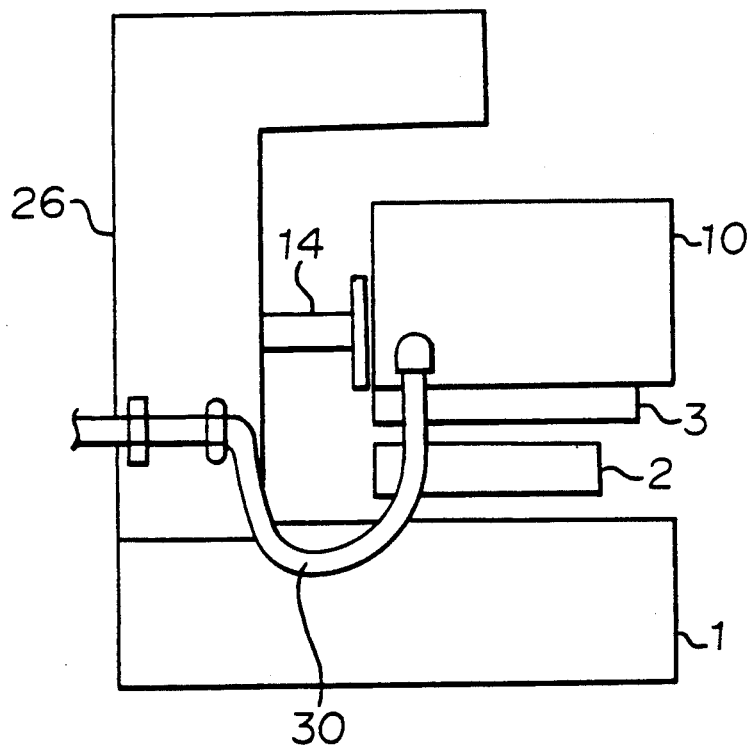
FIG. 3 is a side view showing a conventional wire electric discharge machining apparatus.

In FIG. 1, a reference numeral 100 designates an enclosure member which is made of, preferably, an elastic sheet material in a tubular form having a bellows at its circumferential portion. An end of the tubular enclosure member is sealingly connected to the column 26 so as to surround an opening for supplying a working liquid and the root portion of the arm 14. A conduit 103 for supplying the working liquid is formed in the column 26 so as to communicate the opening with the working liquid supplying means 32. The other end of the tubular enclosure member is sealingly connected to the shielding plate 18 so as to surround a through hole through which the working liquid flows. In FIG. 1, the same reference numerals as in FIG. 3 designate the same or corresponding parts, and therefore description of these parts is omitted.

Figure 2:
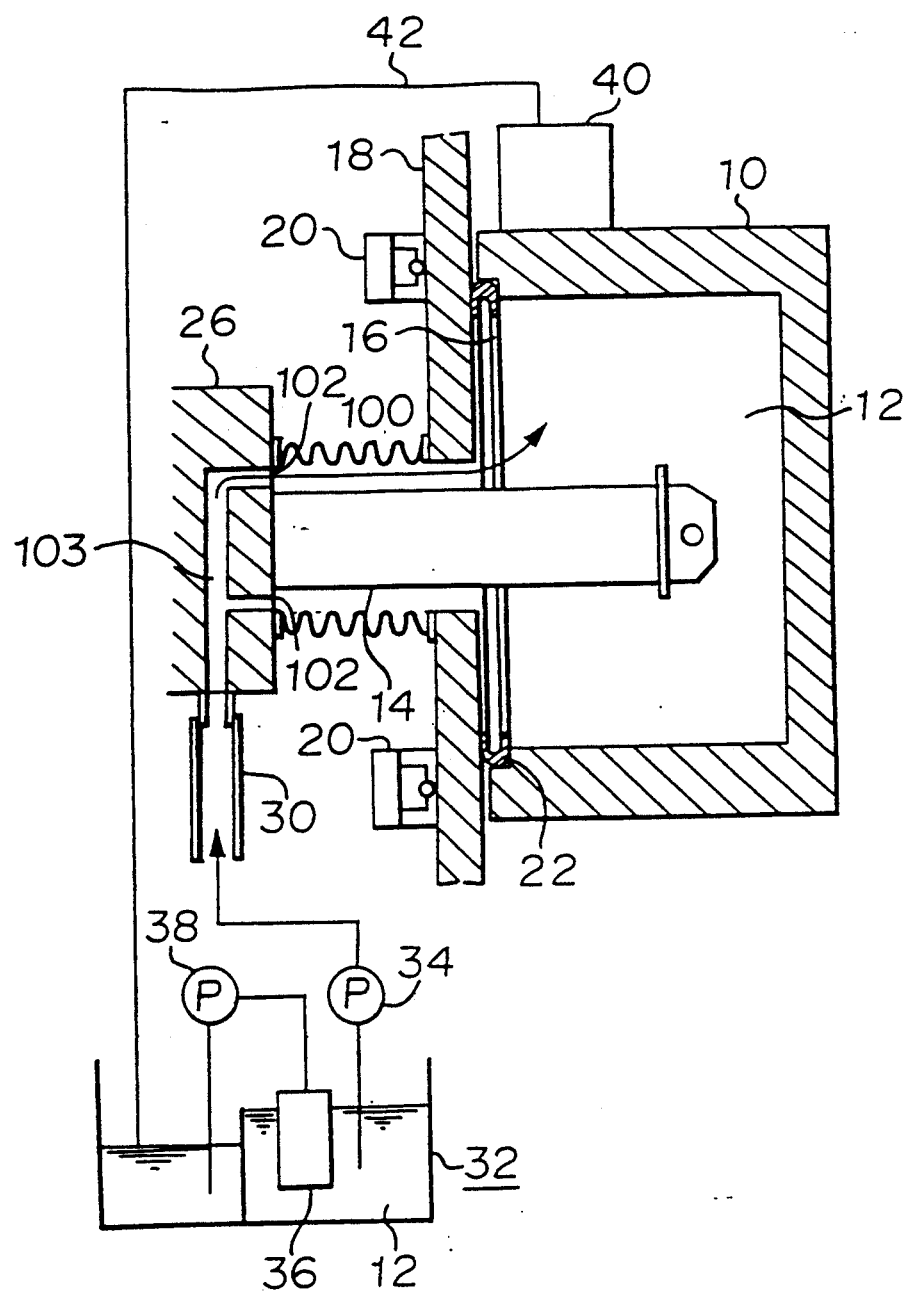
FIG. 2 is a cross-sectional plan view of an embodiment of the tank in the machining apparatus according to the present invention.

FIG. 2 is a cross-sectional plan view of the tank 10. In FIG. 2 a numeral 102 designates the above-mentioned opening or ejecting port in an annular form so that the working liquid is ejected from the conduit 103 into the inside of the tubular enclosure member 100.

Figure 4:
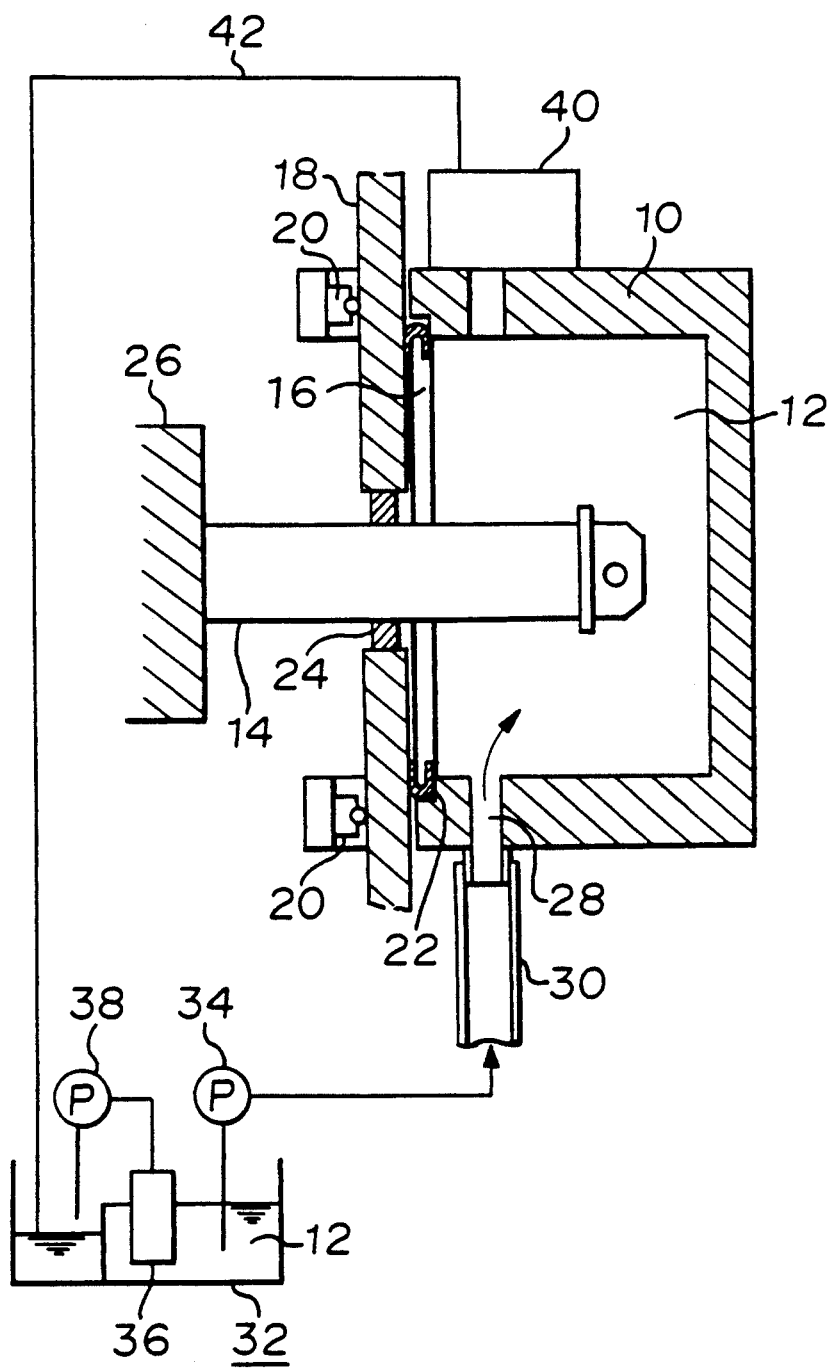
FIG. 4 is a cross-sectional plan view of the tank of the conventional apparatus.
Figure 5:
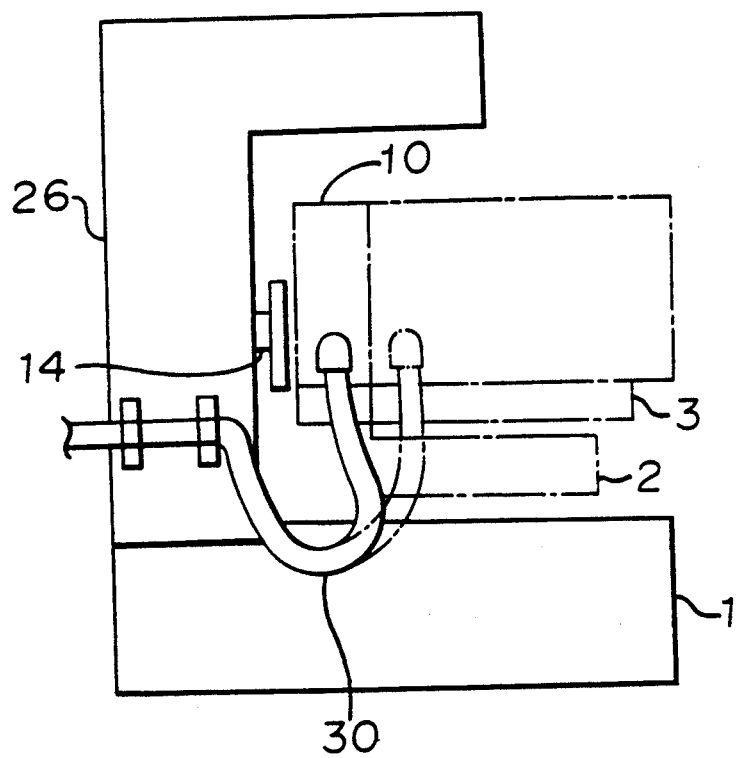
FIG. 5; is a side view showing an arm and the tank in the conventional apparatus.

In FIG. 2, the same reference numerals as in FIG. 4 designate the same or corresponding parts, and therefore description of these parts is omitted.

The function of the wire electric discharge machining apparatus of this embodiment will be described. In order to circulate the working liquid 12 through the tank 10, the pump 34 is actuated to supply the working liquid from the working liquid supplying means 32 through the hose 30 and the ejecting port 102 to the enclosure member 100. The working liquid 12 ejected in the tubular member 100 is supplied to the tank 10 through the space formed between the tubular enclosure member 100 and the outer circumference of the arm 14. When the tank 10 is caused to move relative to arm 14 the tubular enclosure member 100 is expanded or contracted in response to the relative movement of the tank 10. Accordingly, there is no substantial influence to the movement of the table for moving the tank.

Since the tubular enclosure member 100 is connected to the column 26 and the shielding plate 18, it does not relate to the movement of the table even though the diameter of the enclosure member 100 is increased in order to increase a feeding rate of the working liquid 12. Further, by increasing the gap between the enclosure member 100 and the arm 14, a strict requirement on accuracy dimensional is not necessary.

In the above-mentioned embodiment, the ejecting port to supply the working liquid to the tubular enclosure member 100 is formed at the column 26. However, it is possible to connect the conduit 103 with a part of the tubular enclosure member 100 by means of a pipe.

Figure 6:
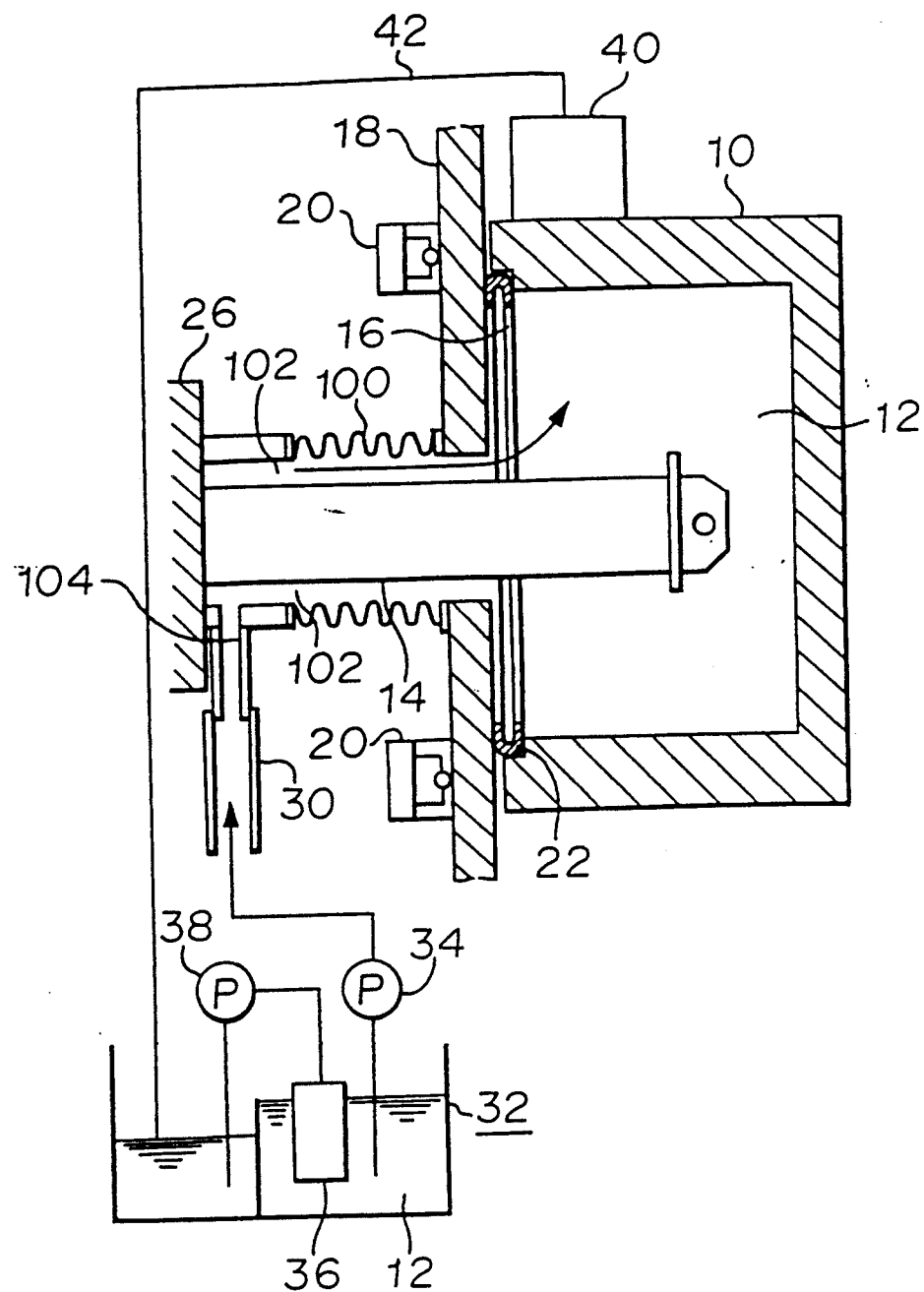
FIG. 6 is a cross-sectional plan view of another embodiment of the wire electric discharge machining apparatus of the present invention.

FIG. 6 shows an embodiment of the wire electric discharge machining apparatus having a tubular enclosure member 100 which is connected to a hose 30 through a pipe 104. In FIG. 6, the same reference numerals as FIG. 2 designate the same or corresponding parts.

Further, in the above-mentioned embodiment, the arm 14 is supported in a form of cantilever. However, the same effect can be obtained by arranging the arm 14 so as to pass through the tank 10 so that both ends of the arm are fixed to the machine body.

Figure 7:
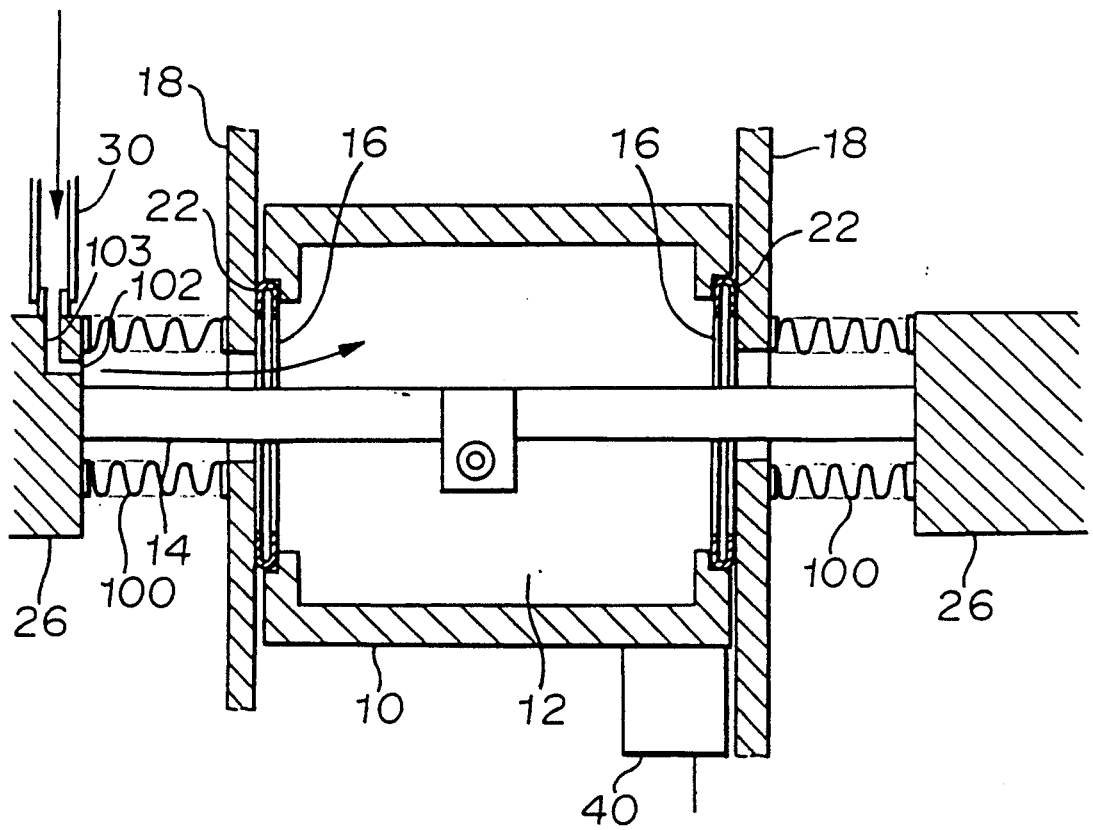
FIG. 7 is a cross-sectional plan view of still another embodiment of the present invention.

FIG. 7 shows an embodiment of the wire electric discharge machining apparatus having an arm 14 which extends passing through a tank 10. Both ends of the arm 14 are fixed to columns 26 provided at both sides of the tank 10. In FIG. 7, the same reference numerals as FIG. 2 designate the same or corresponding parts.

Thus, in accordance with the present invention, the arm is sealingly surrounded by the enclosure member, and the working liquid is supplied to the tank through the space formed between the outer circumference of the arm and the enclosure member. Accordingly, it is unnecessary to use the sealing member, and accuracy of machining does not decrease because no load is applied to the tank.

What is claimed is:

1. A wire electric discharge machining apparatus comprising:
    a tank having an opening at a side surface thereof, said tank being movable in a two-dimensional plane,
    a shielding body having a through hole, which is in slide-contact with the side surface having the opening of the tank so as to close the opening,
    an arm having first and second ends, at least one of which is fixed to a machine body and the other is extended into the tank through the through hole and the opening, and which supports in the tank a wire guide for guiding a wire electrode to a workpiece placed in the tank,
    an enclosure member capable of expansion and contraction in response to a relative movement of the tank to the arm, the enclosure member having first and second ends sealingly connected to the circumferential portion of the through hole of the shielding body and the machine body respectively, and
    a working liquid supplying means for supplying a working liquid to the tank through a space formed between the arm and the enclosure member.

2. The wire electric discharge machining apparatus according to claim 1, wherein a conduit for supplying the working liquid is formed in the machine body so as to communicate the working liquid supplying means with the space in the enclosure member.

3. The wire electric discharge apparatus according to claim 1, wherein the enclosure member is directly communicated with the working liquid supplying means through a tubular member.

4. The wire electric discharge apparatus according to claim 1, wherein the enclosure member is a generally tubular body having a bellows at the circumferential portion.

5. The wire electric discharge apparatus according to claim 2, wherein the conduit has an annular opening surrounding the root portion of the arm so as to communicate with an annular space formed in the enclosure member.

* * * * *